June 13, 1939.  A. G. REZ  2,162,317
METHOD AND APPARATUS FOR FUSING CHARACTERS TO MOLDED GLASS ARTICLES
Filed Oct. 19, 1936   5 Sheets-Sheet 5
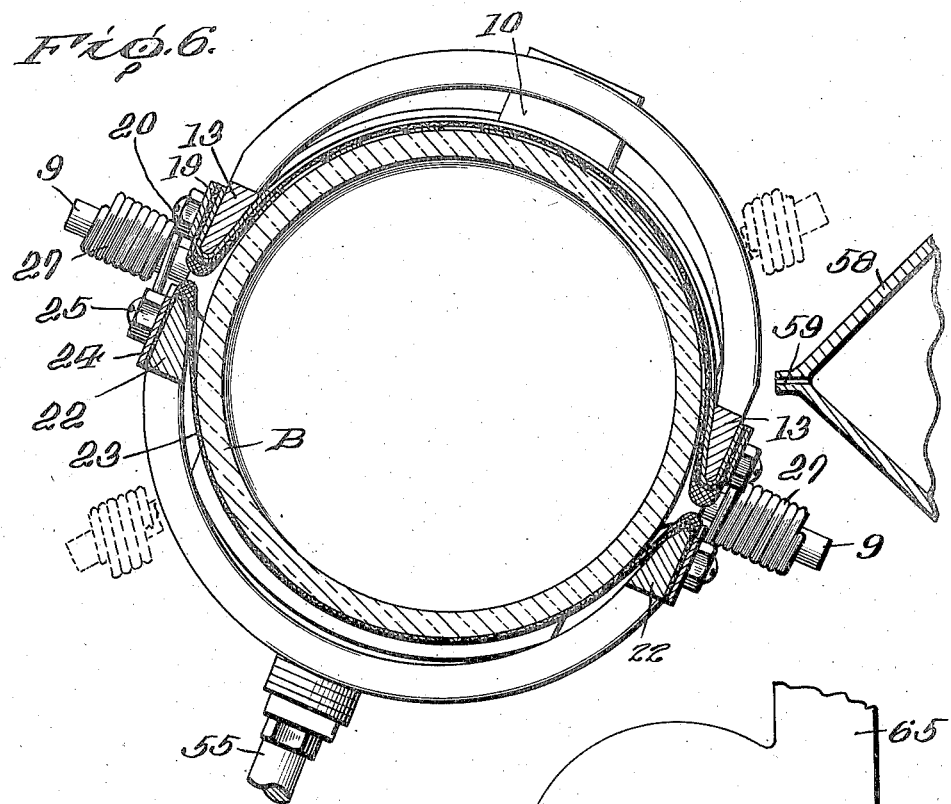
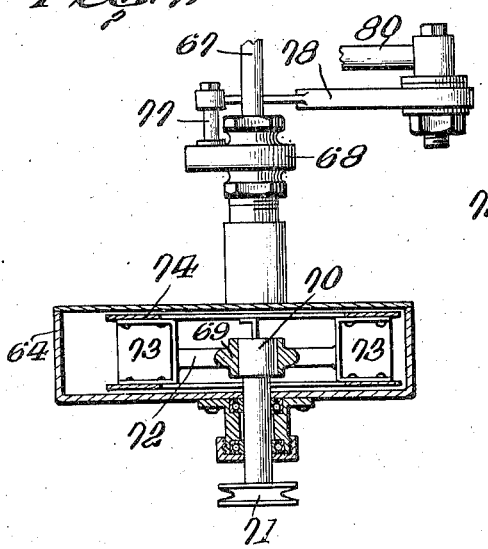
Inventor
Anton G. Rez
By Mason & Porter
Attorneys Patented June 13, 1939

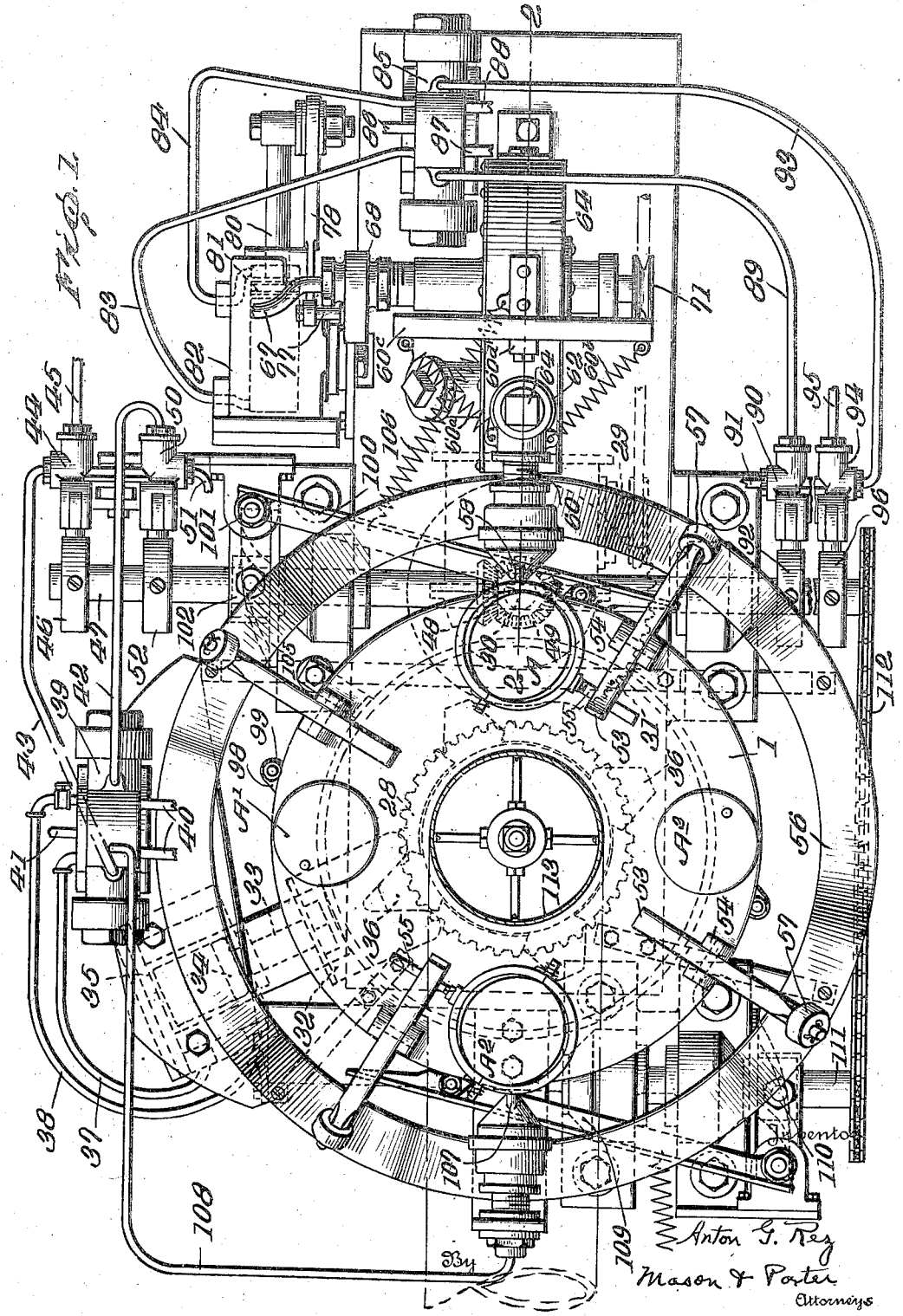

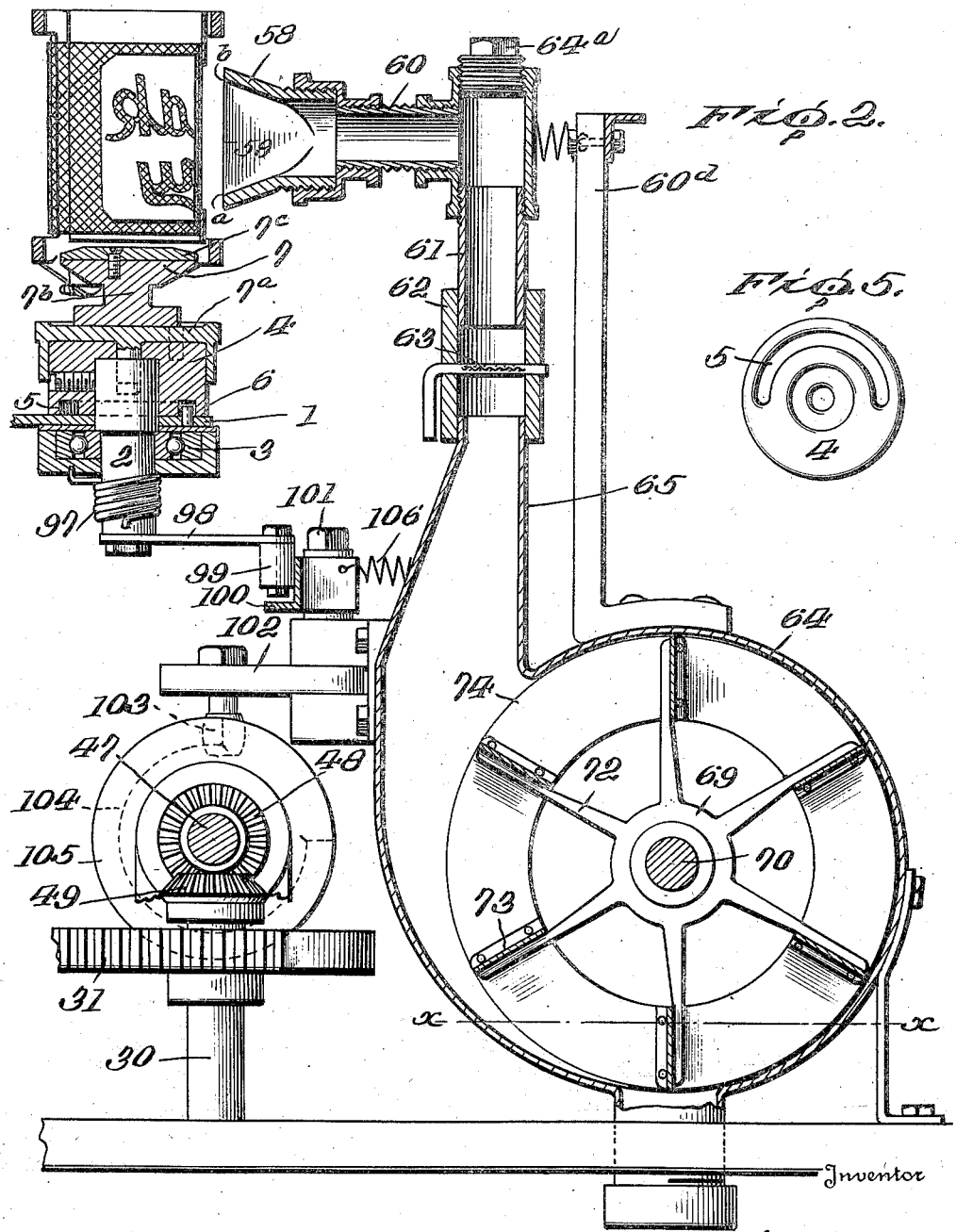

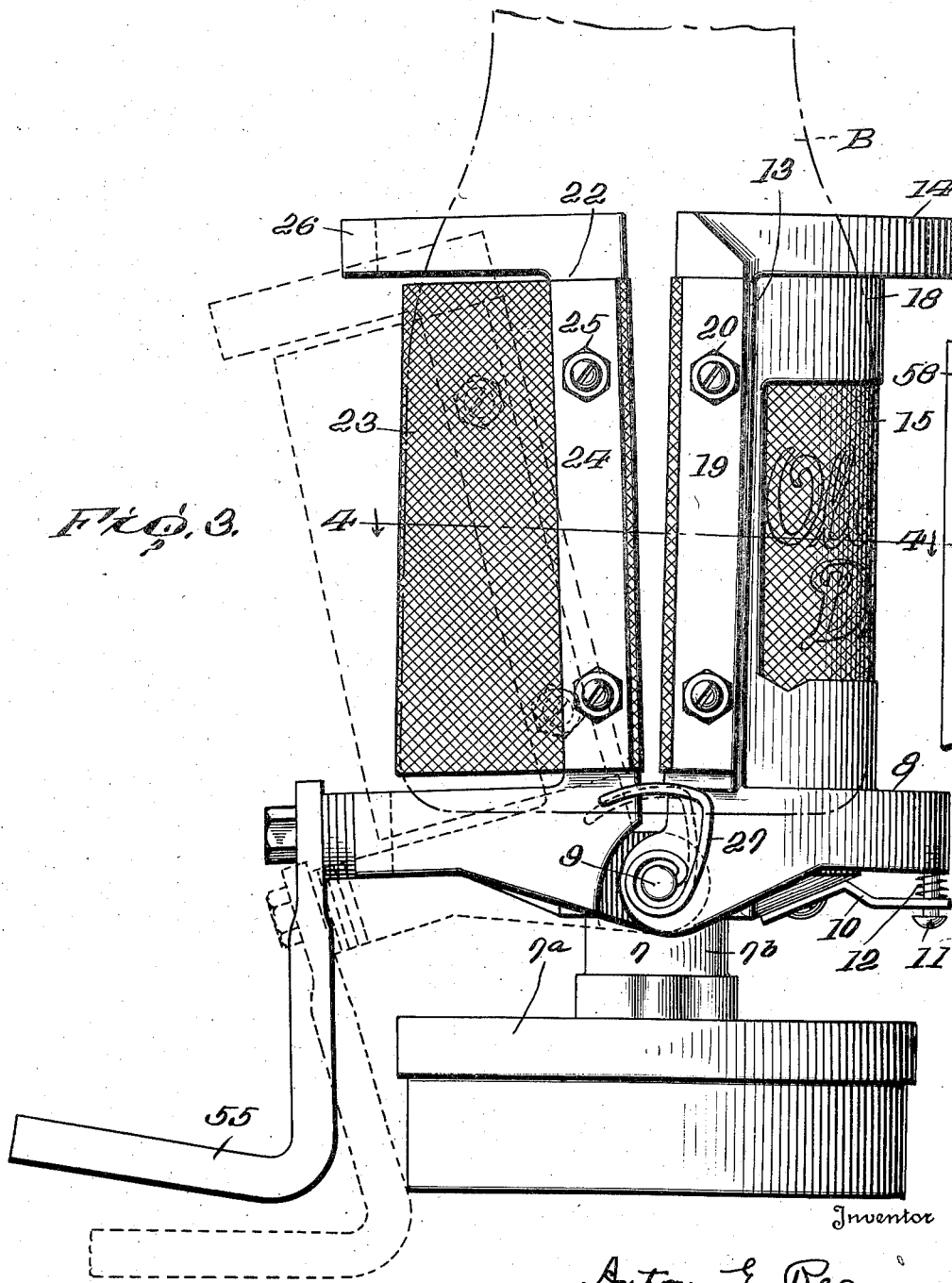

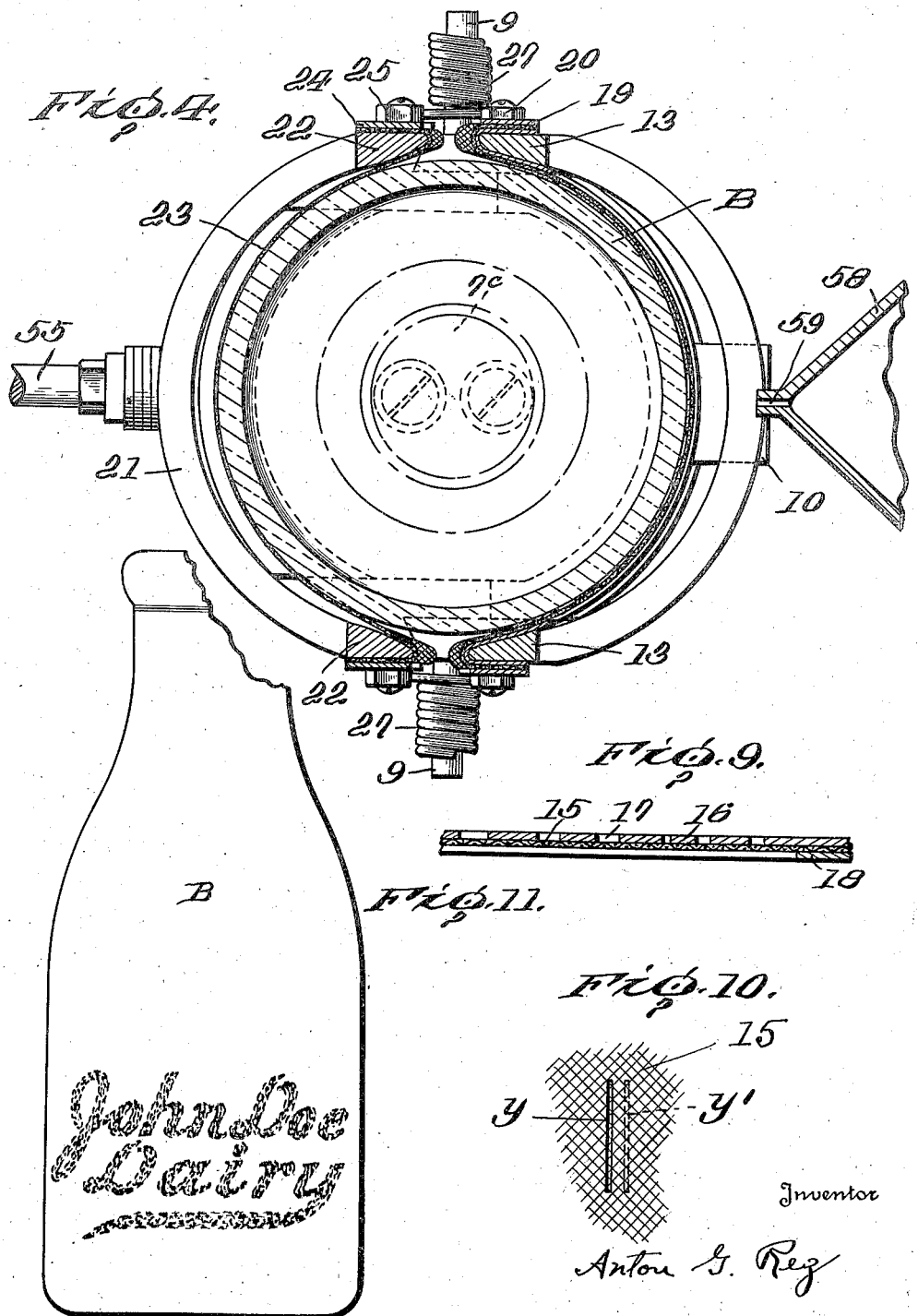

2,162,317

UNITED STATES PATENT OFFICE 2,162,317

METHOD AND APPARATUS FOR FUSING CHARACTERS TO MOLDED GLASS ARTICLES

Anton G. Rez, Seattle, Wash.

Application October 19, 1936, Serial No. 106,466

12 Claims. (Cl. 49—1)

The invention relates to new and useful improvements in a method and apparatus for applying fusible pigment to a molded glass article for forming characters and designs thereon. In my prior Patent No. 2,067,949, granted January 19, 1937, there is shown and described a method and apparatus for applying a fusible pigment to a molded glass article wherein the pigment is suspended in air which is projected against a stencil outlining the character or design which it is desired to create upon the molded glass article. The present invention is directed to an improvement, both in the method and apparatus of applying the pigment.

An object of the invention is to provide a method whereby the pigment may be applied to a uniform extent throughout the entire field so as to produce a clearly defined design.

A further object of the invention is to provide a method whereby an air stream in which the fusible pigment is suspended is projected against the surface of the glass in a direction substantially perpendicular to the surface throughout the entire extent of the field where the pigment is applied.

A still further object of the invention is to provide an apparatus wherein an air stream having a fusible pigment suspended therein may be projected against the surface of the glass so that the line of impact throughout the entire field to which the characters are to be applied is substantially perpendicular to the surface of the glass.

A still further object of the invention is to provide an apparatus having a nozzle for projecting air in which a pigment is suspended against a stencil-covered surface of the glass article in a limited field and wherein the stencil and nozzle are shifted relative to each other so that the air stream will be projected against every part of the stencil and always in a direction substantially perpendicular to the surface thereof.

A still further object of the invention is to provide an apparatus of the above type wherein the nozzle extends from one side edge of the stencil to the other for projecting a relatively narrow air jet containing a fusible pigment against the stencil and the glass surface covered thereby, and wherein said nozzle and stencil are shifted laterally relative to each other so as to place the nozzle over all parts of the stencil.

A still further object of the invention is to provide an apparatus of the above character wherein the stencil covering the glass article consists of a screen to which is attached imperforate metal parts disposed relative to each other so as to form the characters that are to be produced on the glass article.

These and other objects will in part be obvious and will in part be hereinafter more fully disclosed.

In the drawings—

Figure 1 is a plan view of an apparatus embodying applicant's invention and capable of carrying out the improved method;

Fig. 2 is a sectional view on the line 2—2 of Fig. 1;

Fig. 3 is an enlarged side view of one of the bottle supports, also showing the stencil, the means for supporting the same, and the means for clamping the bottle against the stencil;

Fig. 4 is a sectional view on the line 4—4 of Fig. 3;

Fig. 5 is a detail showing the manner of limiting the oscillations which are imparted to the bottle support;

Fig. 6 is a view similar to Fig. 4, but showing in full lines the bottle and stencil positioned relative to the nozzle for the preferred initial impact of the pigment against the stencil, and in dotted lines the shifting of the bottle to bring the nozzle to the other side of the stencil;

Fig. 7 is a horizontal sectional view through the air chamber and showing the means for causing the pigment to be suspended in the air current passing through the chamber;

Fig. 8 is a side view showing the control valve for controlling air flow into the chamber after the pigment is suspended in the air current;

Fig. 9 is a sectional view through the stencil before it is curved to conform to the glass article, and Fig. 10 is a view of a glass article on which characters have been placed by the apparatus shown and the method herein described.

The invention is directed to both the method and apparatus for applying a fusible pigment to a glass article for forming thereon characters, designs and the like. In my prior patent supra, a method and apparatus is described whereby a fusible pigment suspended in an air current is projected against the surface of a molded glass article while said article contains sufficient heat to cause the pigment to adhere to the glass article by fusion. The present invention relates to improvements both in the method and apparatus for applying the pigment. The apparatus includes a means for supporting the glass article with a stencil contacting with the surface where the characters are to be applied. This stencil, in its preferred form, includes a screen preferably made of wires extending in a direction at right angles to each other. Attached to this screen are metal parts which are disposed so that the spaces therebetween form the desired characters or design which is to be formed on the glass article. A nozzle is provided which is relatively long and narrow and the nozzle is so disposed that it extends across the field where the characters are to be applied from one side thereof to the other. When the article is in the form of a bottle having a curved cylindrical face, then the nozzle is so disposed that it extends longitudinally of the article, that is, parallel with the axial line of the cylinder. This air nozzle is placed very close to the screen, so that air ejected from the nozzle will only contact with the surface of the glass in a limited region. Air is taken from any suitable source and is directed through a chamber to the nozzle, and the supply of air is controlled by a valve. The chamber is provided with the fusible pigment and a rotating means in said chamber lifts the pigment and causes it to be carried into the air stream and suspended therein. The air stream as it contacts with the stencil and the surface of the glass contains suspended therein the pigment. The glass article is preferably contacted with almost immediately after it comes from the mold so that the article contains sufficient heat to cause the pigment to adhere thereto by fusion. The glass article and the nozzle are moved relative to each other. As illustrated, the article turns about the axial line of the cylindrical surface so that the cylindrical surface is always the same distance from the nozzle, and the nozzle is positioned so as to direct an air stream perpendicularly against the surface of the glass. This is what accomplishes a uniform application of the pigment to the glass and a clear-cut uniform design.

Referring more in detail to the drawings, the apparatus will be described first. The invention as illustrated includes a turret or table 1 on which are mounted four glass supporting devices which are similar in construction, and the description of one will answer for the other. Projecting through the turret or table 1 is a short shaft 2 supported in a ball bearing 3 so that the shaft may be easily oscillated. Attached to this shaft is a base member 4 having an arcuate groove 5 in the lower face thereof. A pin 6 extending up into the groove contacts with one end of the arcuate groove which serves as a stop to limit the movement of the base. Mounted on the base member 4 is a support proper for the glass article, which support is indicated at 7 in Fig. 2 of the drawings. This support is preferably made in three parts. The lower part 7a has a depending sleeve and a center pin which permits the support to be readily attached to and detached from the base member 4. The support has an intermediate standard 7b to which is connected a detachable plate 7c. Pivotally mounted on this support is a stencil supporting member 8. Said stencil supporting member is carried by pivots 9, 9, one on each side of the support. A bracket arm 10 projects from the support and a headed bolt 11 threaded into the stencil supporting member 8 projects through the bracket. A spring 12 normally forces the stencil supporting member in a counter-clockwise direction on its pivots. The support, however, is capable of yielding to pressure so that it may turn for a short distance in a clockwise direction. Extending upwardly from this support is the holder for the stencil.

Said holder includes upright bars 13, 13 and an upper bar 14 which is connected to the upright bars. The stencil is shown in detail in Fig. 9. It includes a screen 15 to which is attached a metal plate 16 having cutouts 17 and these cutouts are shaped so as to form the characters that are to be formed on the article. The plate 16 may be made of any suitable metal, such as copper or copper alloys. It is essential, however, that it shall be readily bendable so as to conform to the surface of the article to which the characters are to be applied. The plate and the screen are preferably brazed together. The screen serves as a support for the sections in the design which are isolated from the main portion of the metal plate. The plate 16 which is the stencil proper is attached to the inner side of the screen. There is a similar metal plate 18 attached to the outer face of the screen and said plate has an opening therethrough which defines the field in which the stenciled design is located. The stencil thus formed is attached to the stencil holder 8 by bending the end portions about the bars 13 and securing the same to the bars by plates 19 which are secured by clamping bolts 20. When the stencil is attached to its holder it is given a curvature corresponding to the curvature of the glass article to which the characters are to be applied.

Opposed to the stencil holder is an article supporting member which includes a supporting base 21 pivotally mounted on the pivot pins 9, 9. Extending upwardly from this base member 21 are bars 22, 22, and a screen 23 or other suitable flexible member is bent around the bars and secured thereto by a plate 24 and bolts 25. This screen is made to conform to the surface of the glass article so that it will contact therewith throughout a considerable angle. The bars 22, 22 are connected by an upper member 26. A spring 27 coiled about each pivot pin 9 is attached to the pivot pin at one end and to the base member 21 at its other end, and these springs serve to turn the support so as to cause the screen to contact with the article. The article as shown in the drawings is in the form of a bottle and is indicated at B. The bottle is placed on the supporting plate 7c and the base member 21 when released will be moved by the spring so as to cause the screen 23 to contact with the bottle and force it tightly against the stencil. The stencil support is capable of yielding to a slight extent so as to insure a firm uniform contact between the stencil and the bottle from the lower end to the upper end thereof, and the metal in the supporting screen will yield sufficiently to conform to the curvature of the bottle. The bottles may be placed on the support and removed therefrom manually as will be hereinafter more fully disclosed.

As illustrated there are two bottle supporting devices arranged diametrically opposed to each other on the turret 1. The turret is mounted on a shaft to which is connected a pinion 28. The turret is given an intermittent rotation. It is moved through an arc of ninety degrees and then comes to rest, and it is while the turret is at rest that the characters are applied to the bottle. Any suitable means may be provided for intermittently rotating the turret. As shown, the power is derived from a main shaft 29 which operates through a train of mechanism for rotating a vertical shaft 30. This vertical shaft carries a segment gear 31, which segment extends to a distance slightly less than ninety degrees. The segment as shown in Fig. 1, is out of mesh with the pinion 28. When, however, the vertical shaft is rotated in a clockwise direction, this segment pinion will engage the pinion 28 and impart thereto a movement through an angle of slightly less than ninety degrees. The segment is then unmeshed from the pinion 28 and continues its rotation. The turret, however, stops and remains in a stationary position while the segment is making its complete rotation and comes again into mesh with the pinion 28. The shaft 30 also carries a gear 49 meshing with a gear 48 on the control shaft 47 for rotating the same.

As a means for positively positioning the turret, a locater is provided which includes a plate 32 carried by a piston rod 33 attached to a piston head 34 working in a cylinder 35. The piston head is moved by air pressure and the supply of air is timed so that when the segment gear is about to become unmeshed from the pinion 28, said locater begins its forward movement and engages a lug 36 attached to the turret. The walls of the locater are tapered and likewise the walls of the lug, and therefore, as the locater moves forward, it will move the turret to a very definitely set position and hold it in this position all the time that the turret is idle and until the locater is retracted. The air supply to the cylinder 35 will be shifted to the other side of the piston so as to retract the locater in time to permit the gear segment when it meshes with the pinion 28 to rotate the turret through another angular movement.

Air is supplied to the cylinder 35 through the pipes 37 and 38. The pipes 37 and 38 are connected to a slide valve 39 which is of the usual construction. This slide valve in turn is connected with the exhaust pipes 40, 40 and the intake pipe 41 which leads to a suitable source of air supply. Air is supplied to one side of the slide valve for shifting the same from the pipe 42 and to the other side of the slide valve for shifting the same to the pipe 43. The pipe 42 is connected to a timing valve 50 which in turn is connected to a source of air supply through a pipe 51. A cam 52 on the shaft 47 operates to control this timing valve. The pipe 43 is connected to the timing valve 44, which in turn is connected through the pipe 45 to a source of air supply. A cam 46 on the shaft 47 controls this timing valve 44. Through these timing valves air is supplied to one side or the other of the slide valve for shifting the same, and the slide valve in turn supplies air either to the pipe 37 or the pipe 38. This provides a very sensitive way of controlling the air supply for shifting the locater so that the locater will be moved quickly just as soon as the segment gear becomes unmeshed from the pinion 28 for the locating and positioning of the turret and locking it in set position. It will also be moved quickly for releasing the turret so that when the segment gear again meshes with the pinion 28 it can turn it to another angular position.

Through the means described above the turret is rotated so as to position the article at the station indicated at A, which is the station for applying the pigment to the surface of the glass. It is then moved to the station A¹ which is an idle station. At this station, the bottle is removed from the holder. The turret then moves so as to present the holder from which the bottle has been removed to the station A², which is the station for the cleaning of the screen. It is then turned to bring the holder to the station A³, which is another idle station, and at this station a bottle is inserted in the holder. In the illustration shown in Fig. 1, the article holders have been removed from the supports at the idle stations A¹ and A³ for the sake of clearness. Associated with each station is a lever 53. This lever is pivoted between supporting lugs 54 on the turret. Attached to the inner clamping member of the article support is an arm 55 which extends underneath the end of the lever 53. When the outer end of the lever is raised, the inner end is lowered and will contact with the arm and move the outer member of the holder so as to release the article. Extending around the turret is a stationary cam 56. Each lever carries a roller 57 which contacts with this cam. The cam is provided with raised and depressed portions so that as the turret approaches the station A¹ where the article is to be removed from the holder, the outer end of the lever will be raised so as to press on the arm 55 and open the holder to release the bottle. After the bottle is released, the lever swings so as to release the holder during the cleaning of the same, and when the station A³ is approached then the lever is again swung to open the holder so that a bottle may be inserted therein. After the holder passes away from the station A³, the lever is moved so as to release the arm and the springs 27 move the inner section of the holder into contact with the bottle and the bottle against the stencil.

The pigment is applied to the bottle while the bottle contains the molding heat. The bottle may be heated after it leaves the molding machine, if desired, or may be cooled as provided for in my prior patent supra, but it is desirable that the bottle shall have the proper temperature for causing the pigment selected to adhere thereto by fusion. The pigment may be of any well known character, but is such that it will adhere by fusion to the heated bottle. The pigment is applied by suspending the same in an air current which is directed against the stencil.

In Fig. 2 of the drawings there is shown more or less in detail a suitable device for ejecting the pigment against the stencil for forming the characters on the glass article. This device includes an ejecting nozzle 58. The ejecting nozzle has a passage 59 through which the air and pigment are ejected, and this passage extends from the point $a$ to the point $b$ (Fig. 2), and it is relatively narrow as indicated in Fig. 4. The passage 59 extends from the lower part of the stencil to the upper part thereof so that the air stream passing from the nozzle will contact with the stencil in a narrow limited field laterally, but from the upper to the lower side of the stencil. This nozzle is placed very close to the screen, so that there is very little lateral spread of the air stream as it leaves the nozzle before it contacts with the article. The nozzle 58 is carried by a pipe 60 mounted at the upper end of a pipe 61. This pipe 61 is in turn mounted in a pipe section 62 having a screen valve 63 located therein, which may be shifted by hand. The upper end of the vertical pipe section is closed by means of a cap nut 64a which may be readily removed for cleaning the parts. The pipe section 62 is connected to the discharge pipe 65 of an air chamber 64. Said chamber is supplied with air through a suitable supply pipe 67 which is connected to a suitable source of supply. In this pipe is a control valve 66. When the valve is open, the air enters the chamber 64 and passes out through the discharge pipe 65 through the nozzle and is ejected from the nozzle on to the stencil. Located in the air chamber is a rotating lifter 69. Said rotating lifter is mounted on a shaft 70 which extends out through the wall of the chamber 64 and is provided with a belt wheel 71 whereby the shaft may be rotated from a suitable motor. The lifter 69 is provided with radial arms 72 to which are connected blades 73. Connected to the blades are supporting rings 74. These blades move close to the inner surface of the wall of the air chamber 64 and serve to lift the pigment placed in the bottom of the air chamber and cause it to gradually drop into the air stream when the air is flowing into the chamber and out through the nozzle. In this way, the pigment is suspended in the air stream and will be projected against the glass surface in the air stream. The air chamber is preferably filled to a line indicated at $x$, $x$ in Fig. 2, and the supply may be automatically maintained by feeding the same by gravity through a feed pipe which enters the air chamber.

The control valve 68 is in the form of an oscillating gate. There is a port leading through the valve casing 75, and in this valve casing is a gate 76 mounted on a shaft 77. When the shaft is turned in a counter-clockwise direction as viewed in Fig. 8, the gate will close the port and prevent air from passing therethrough, and when it is moved in a clockwise direction, then it will open the port. Attached to the shaft 77 is an arm 78 and this arm is provided with a slot 79. Mounted on the end of a piston rod 80 is a roller which runs in the slot 79. This roller when the piston rod is reciprocated, causes the arm 78 to oscillate and thus the control valve is opened and closed. The piston rod 80 is attached to a piston 81 adapted to reciprocate in a cylinder 82. Air is led to the cylinder 82 at one side of the piston 81 through a pipe 83 and is led to the other side through a pipe 84. When air enters the pipe 83, then the air on the other side of the piston is exhausted through the pipe 84. The pipes 83 and 84 are connected to a slide valve 85 similar in construction to the slide valve 39. Air is supplied from a suitable source to this slide valve 85 through a pipe 86 and exhaust takes place through the pipes 87 and 88, respectively. The slide valve is moved by air pressure. There is a pipe 89 connected to one side of the valve, and this pipe is in turn connected to a timing valve 90 and the timing valve 90 is connected through a pipe 91 to an air supply. This timing valve is operated by a cam 192 mounted on the shaft 47. Air is supplied to the other side of the valve through the pipe 93 which is connected to the timing valve 94, and air is supplied to this timing valve through the pipe 95. The timing valve is operated by a cam 96 on the shaft 47. Thus it is that these timing cams control the movement of the slide valve 85 and move the same so as to supply air to the cylinder containing the piston which is connected to the control valve for shifting the control valve. When the article is properly placed ready to receive the pigment, the control valve opens and air at once under pressure enters the air chamber and forces air out through the nozzle with the pigment suspended therein. As soon as the field has been properly contacted with by the air stream, then the control valve is closed. The lifter continues to rotate keeping the pigment stirred and suspended in the air in the chamber so that the instant the control valve is opened, the air with pigment suspended therein passes from the nozzle into contact with the glass surface.

The air nozzle is so disposed relative to the support for the bottle that the air stream is in a plane passing through the center of the bottle, and therefore, the air stream strikes the glass surface exposed through the stencil at right angles to a line tangent at the point of impact which is a line perpendicular to the surface of the glass. When the pigment contacts with the glass surface, while moving in a direction perperpendicular with the surface, it will be caused to strike the same in a direction where there is no tendency for a glancing blow, but in a direction where the air stream will hold the particles of pigment contacting with the glass until the heat of the glass will cause the pigment to adhere thereto by fusion. While the air stream spreads slightly between the nozzle and the glass, nevertheless, the pigments contact with the glass surface substantially when moving perpendicular thereto, and this is what brings about the efficient adherence of the pigment to the glass.

The nozzle is preferably positioned at one extreme side of the stencil as shown in Fig. 6. The support for the bottle is oscillated so as to gradually shift the field where the air stream contacts with the bottle through the openings in the stencil, and this shifting proceeds progressively until the entire field has been contacted with by the air stream with the suspended pigment therein. It will be noted that the support for the bottle oscillates about the longitudinal center line of the bottle, and therefore, the nozzle will maintain the same position relative to the surface at all points in the field. In other words, the pigment is projected against the surface of the glass so as to strike the same substantially perpendicular to the surface throughout the entire field. After the whole support has been oscillated so as to produce a relative movement between the glass and the nozzle in one direction across the field, it may then be reversed and the application of the pigment progressively applied the other way across the field. The support may be oscillated several times. It is essential, however, that it shall be oscillated so that every part of the field shall be brought directly in line with the nozzle. When the support is reversed, the pigment then contacts with the pigment which has been fused to the bottle, and will be fused thereto and thus build up the characters. The fact that the pigment remains fused to the bottle for a brief period of time before the reverse direction of movement enables the pigment to be thoroughly heated so that the particles contacting therewith will adhere to and build up the characters to the desired thickness.

The means for oscillating the support will now be described. Mounted on the shaft 2 is a spring 97. One end of the spring is connected to the shaft and the other end is connected to the housing for the ball bearing 3. Attached to the lower end of this shaft 2 is an arm 98 carrying a roller 99. A bar 100 is fixed to a shaft 101. This shaft 101 carries an arm 102 (see Fig. 2) provided with a stud 103 bearing against a face cam 104, on a cam drum 105 mounted on the shaft 47. The bar 100 is an angle bar and the roller 99 contacts with the face of the angle bar. A spring 106 is connected to the bar 100 and to a suitable lug on the frame and normally holds the stud in contact with the face cam 104. The spring 97 turns the article support until the pin 6 contacts with one end of the slot 5. This is the initial position of the support when the bottle is placed therein, and this initial position of the support relative to the nozzle is indicated in Fig. 6. When the bottle is brought to the station where the pigment is applied, the roller 99 is brought into engagement with this bar 100. As the shaft 47 rotates, it will swing the bar in a clockwise direction, and this will cause the bottle to turn so as to produce a relative movement between the nozzle and the bottle, placing the nozzle over every portion of the field. In Fig. 4 of the drawings, the bottle is shown as having been turned half-way through its extent of oscillation, and it will be noted that the nozzle is so positioned that the air stream is in a line passing centrally through the bottle, and the pigments will contact with the glass surface when moving in a direction perpendicular to the surface.

The actuating members are timed so that when the support is brought to the station A and the turret comes to a standstill, then the control valve is opened so that the air with the pigment suspended therein is ejected from the nozzle into contact with the stencil and into contact with the glass through the openings in the stencil. The pigment contacting with the glass will be held against the glass until certain of the pigments, at least, adhere to the glass by fusion. The oscillation of the support begins at once and gradually the position of the nozzle and the stencil shift relative to each other until the whole field is subjected to the impact of the pigment with the air stream. Upon the completion of the application of the pigment, the control valve is closed and the air stream through the nozzle stops, so that there is no wasting of the pigment. The lifter continues to lift the pigments and maintain it suspended in the air in the chamber ready for the next operation. The machine is automatic and will move the carrier after the oscillations thereof cease and the control valve is closed, to position the bottle support at the station A where the bottle may be lifted from the support which is opened automatically through the action of the lever 53.

The stencil as shown in Fig. 10, includes a screen 15. This screen is preferably made of wires which cross each other substantially at right angles. The wires are disposed so that they cross the longitudinal axis of the passage 59 in the nozzle at an acute angle thereto. This is diagrammatically illustrated in Fig. 10. The nozzle shifts laterally relative to the screen and when it moves from the full line position indicated at $y$ (Fig. 10) to the dotted line position $y'$, it will be noted that the place where the wire crossed the passage shifts longitudinally thereof and thus it is that every particle of the field will be subjected to the impact of the air current and the pigment, and the wires of the screen will not cover the surface so as to prevent it. This is of great advantage in producing a uniform character wherein there are no lines crossing the same.

At the station A², the stencil is cleaned. This is accomplished by forcing an air stream one way or the other through the stencil. As shown, a nozzle 107 is provided which is connected through a pipe 108 to the slide valve 39. This slide valve will direct the current of air from the nozzle on to the stencil. A bar 109 similar to the bar 100 is oscillated by a stud 110 contacting with a cam carried by a shaft 111. This shaft is driven by a chain drive 112 from the shaft 47. The swinging of the bar 109 will cause the support to oscillate so as to bring every part of the stencil in front of the nozzle, and the air stream will cause the pigment adhering to the stencil and the screen forming a part of the stencil to be detached therefrom and forced toward the center of the turret. Directly over the turret is a pipe 113 which is connected to a suitable source of suction and the pigment is drawn into a pipe and through a suitable strainer where it may be re-claimed.

The pipe section 61 is mounted in the pipe section 62 in any suitable way so that it may be raised and lowered or so that it may turn to permit the nozzle to swing to one side in case force is applied accidentally against one side of the nozzle. Springs 60a and 60b are connected to the nozzle and to a bar 60c mounted on a suitable bracket 60d, and these springs normally hold the nozzle in its proper position and will return it to this position, provided it is accidentally turned to either side from normal.

The apparatus described above may be utilized in carrying out my improved method of applying pigment to glass articles. The method consists in projecting an air stream in which a fusible pigment is suspended against the surface of the glass in a direction substantially perpendicular to the surface throughout the entire field where the characters are to be formed and while the glass contains heat sufficient to cause the pigment to adhere thereto by fusion. When the pigment is projected against the glass in a direction perpendicular thereto, it will not be deflected to one side or the other, but will be held against the glass by the air stream for a time sufficient to permit it to adhere thereto by fusion. Some of the pigment may fall when the nozzle is shifted, but a sufficient amount of the pigment will be fused to the glass in order to build up characters or designs thereon, the shape of which is determined by the stencil. In carrying out the method, where a single nozzle is used, then the nozzle is so shaped that it only covers the field where the pigment can be projected perpendicularly against the surface of the glass as it passes from the nozzle in the air stream and the glass and nozzle are shifted relative to each other until the pigment is caused to contact with the glass throughout the entire field. It will be understood that other forms of apparatus may be used for carrying out the method, and it is also understood that various changes in the details of construction and the arrangement of the parts described may be made without departing from the spirit of the invention as set forth in the appended claims.

Having thus described the invention, what I claim as new and desire to secure by Letters-Patent, is—

1. An apparatus for applying characters to glass articles including in combination, means for supporting the article, a stencil conforming to the article, means for holding the stencil in contact with the article and means for projecting air in which a fusible pigment is suspended through the stencil and against the surface of the glass while said glass contains heat sufficient to cause the pigment to adhere thereto by fusion, said air projecting means including a nozzle shaped and disposed relative to the curved surface so that the air stream at each point of contact with the surface strikes the surface substantially radially thereof and means for shifting the supporting means and nozzle relative to each other so that the air stream will contact with the entire field to which the characters are to be applied in a similar manner.

2. An apparatus for applying characters to glass articles including in combination a support for the article, a stencil conforming to the article, means for holding the stencil in contact with the article, a nozzle, means for projecting an air stream from said nozzle in which a fusible pigment is suspended, said nozzle being disposed so that the air stream is projected from said nozzle in a direction substantially perpendicular to the surface of the glass and while said glass contains heat sufficient to cause the pigment to adhere thereto by fusion, and means for shifting said nozzle and glass article relative to each other until the entire field is contacted with and for maintaining the air stream at all times substantially perpendicular to the surface of the glass.

3. An apparatus for applying characters to bottles including in combination a support for the bottle, a nozzle associated with said support, means for projecting an air stream from said nozzle in which a fusible pigment is suspended, a stencil mounted on said support and contacting with the bottle throughout the entire region in which the characters are to be applied, means for clamping the bottle against the stencil, and means for oscillating said bottle and stencil whereby said nozzle is given a relative progressive movement back and forth across said stencil, said nozzle being constructed and disposed so that the air stream at all points of contact with the bottle is moving in a direction substantially radially of the curved surface of the bottle.

4. An apparatus for applying characters to bottles including in combination a support for the bottle, a stencil carried by said support and adapted to conform to and contact with the surface of the bottle throughout the entire region in which the characters are to be applied, means for holding the bottle against said stencil, means for oscillating said support, a nozzle, means for projecting an air stream from said nozzle in which a fusible pigment is suspended, said nozzle being shaped so as to produce an air stream which is relatively narrow longitudinally of the bottle and which reaches from the upper to the lower side of said stencil, said nozzle being dimensioned and disposed so that the air stream at all points of contact with the bottle is moving in a direction substantially radially of the curved surface of the bottle.

5. An apparatus for applying characters to glass articles including in combination a turret, means for intermittently rotating the turret, a plurality of article supporting devices mounted on said turret, a stencil associated with each article supporting device, means for clamping the article against the stencil, a pigment supplying means including a nozzle, means associated with the nozzle for projecting an air stream from the nozzle in which a fusible pigment is suspended, and means for oscillating the support for the glass article and the stencil about a common axis for producing a relative movement between the nozzle and the stencil.

6. An apparatus for applying characters to glass articles including in combination a turret, means for intermittently rotating the turret, a plurality of article supporting devices mounted on said turret, a stencil associated with each article supporting device, means for clamping the article against the stencil, a pigment supplying means including a nozzle, means associated with the nozzle for projecting an air stream from the nozzle in which a fusible pigment is suspended, means for oscillating the support for the glass article for producing a relative movement between the nozzle and the stencil, and means operated in timed relation with the turret for controlling the air projected from said nozzle.

7. An apparatus for applying characters to glass articles including a turret, a plurality of article supporting devices carried by said turret, means for intermittently rotating said turret for presenting said article supporting device to a loading station, then to a pigment applying station and then to an unloading station, a nozzle located at said pigment applying station, means for projecting an air stream from said nozzle in which a fusible pigment has been suspended, a stencil associated with each article supporting device, a clamping means for clamping the article against the stencil, and means for automatically separating the clamping device from the stencil at the loading and unloading stations and for holding the clamping device against the article at the pigment applying station.

8. An apparatus for applying characters to glass articles including a turret, a plurality of article supporting devices carried by said turret, means for intermittently rotating said turret for presenting the article supporting device to a loading station, then to a pigment applying station, and then to an unloading station, and finally to a stencil cleaning station, a stencil mounted on each article supporting device, a clamping means associated with each stencil, a nozzle at the pigment applying station, means for projecting an air stream from said nozzle in which a fusible pigment is suspended, a nozzle at the stencil cleaning station, and means for projecting an air stream against the stencil for cleaning the same.

9. An apparatus for applying characters to glass articles including a turret, a plurality of article supporting devices carried by said turret, means for intermittently rotating said turret for presenting the article supporting device to a loading station, then to a pigment applying station, and then to an unloading station, and finally to a stencil cleaning station, a stencil mounted on each article supporting device, a clamping means associated with each stencil, a nozzle at the pigment applying station, means for projecting an air stream from said nozzle in which a fusible pigment is suspended, a nozzle at the stencil cleaning station, means for projecting an air stream against the stencil for cleaning the same, and means at the pigment applying station for oscillating the article supporting device while the pigment is being applied to the article.

10. An apparatus for applying characters to glass articles including a turret, a plurality of article supporting devices carried by said turret, means for intermittently rotating said turret for presenting the article supporting device to a loading station, then to a pigment applying station, and then to an unloading station, and finally to a stencil cleaning station, a stencil mounted on each article supporting device, a clamping means associated with each stencil, a nozzle at the pigment applying station, means for projecting an air stream from said nozzle in which a fusible pigment is suspended, a nozzle at the stencil cleaning station, means for projecting an air stream against the stencil for cleaning the same, means at the pigment applying station for oscillating the article supporting device while the pigment is being applied to the article, and means at the stencil cleaning station for oscillating the support carrying the stencil during the cleaning thereof.

11. An apparatus for fusing designs to the curved surfaces of glass articles including in combination means for supporting the article, a stencil carried thereby comprising a wire screen and metal sections brazed to and supported by said screen and disposed so as to form openings corresponding to the design that is to be formed on the glass article, means for pressing the article against the stencil for holding the same in close contact with the screen throughout the entire region of the design on the screen, means for projecting a stream of fusible pigment against the surface of the glass while the glass contains heat sufficient to cause the pigment to adhere thereto by fusion, said pigment projecting means including a nozzle shaped and disposed relative to the curved surface so that the pigment stream at each point of contact with the surface strikes the surface substantially radially thereof, and means for shifting the screen and article relative to the stream of pigment so that the entire field is contacted with by said pigment in a similar manner.

12. The method of applying designs to glass articles having curved surfaces consisting in associating with the article a stencil curved to conform to the surface of the article and contacting therewith, projecting a stream of fusible pigment through the stencil against the surface of the glass while the glass contains heat sufficient to cause the pigment to adhere thereto by fusion, and in a limited portion of the field where the designs are to be applied, with the pigment particles striking the curved surface radially thereof whereby the particles of pigment contacting with the glass impinge on the soft glass surface and adhere until the heat of the glass will cause the pigment to unite thereto by fusion, and shifting the glass and stream of pigment relative to each other until the entire field is contacted therewith by said pigment in a similar manner.

ANTON G. REZ.